United States Patent
Worrel et al.

(10) Patent No.: US 6,817,828 B2
(45) Date of Patent: Nov. 16, 2004

(54) PALLET HANDLING METHOD AND APPARATUS

(75) Inventors: Alan Christopher John Worrel, Northampton (GB); Christopher Brian Watts, Andover (GB); Gary Rogers-Mitchell, Basingstoke (GB); Simon Philip Scott, Milton Keynes (GB); Brian Edward Newin, Hampshire (GB)

(73) Assignee: SSI Schaefer Limited, Andover (GB)

( * ) Notice: Subject to any disclaimer, the term of this patent is extended or adjusted under 35 U.S.C. 154(b) by 197 days.

(21) Appl. No.: 10/012,198

(22) Filed: Dec. 3, 2001

(65) Prior Publication Data

US 2002/0085902 A1 Jul. 4, 2002

(30) Foreign Application Priority Data

Dec. 4, 2000 (GB) ............................................. 0029530

(51) Int. Cl.[7] .............................................. B65G 57/28
(52) U.S. Cl. ..................................................... 414/788.7
(58) Field of Search ................................. 414/112, 639, 414/763, 330, 783, 788.7, 758, 795.8, 798.9, 797.2, 797.3, 927–929

(56) References Cited

U.S. PATENT DOCUMENTS

| | | | | | |
|---|---|---|---|---|---|
| 1,977,497 | A | * | 10/1934 | Springer | 414/789.2 |
| 2,096,958 | A | * | 10/1937 | Clerc | 414/276 |
| 4,019,639 | A | * | 4/1977 | Stobb | 414/759 |
| 4,084,713 | A | * | 4/1978 | Rohrs et al. | 414/537 |
| 5,950,771 | A | * | 9/1999 | Ferrisi et al. | 187/411 |
| 6,050,771 | A | * | 4/2000 | Dykstra | 414/795.8 |

* cited by examiner

Primary Examiner—Kathy Matecki
Assistant Examiner—Charles A. Fox
(74) Attorney, Agent, or Firm—Herbert Dubno

(57) ABSTRACT

The specification discloses a pallet orienting apparatus for use in a return lane of a pallet live storage system, wherein one or more empty pallets may be placed in the pallet orienting means in a generally upright position, the pallet being rotated to a pallet delivery position in which the pallet lies in a generally horizontal plane. A plurality of pallets may be simultaneously handled by the orienting apparatus, which may be linked to a computerized control system for a live storage warehouse. The specification describes preferred methods for handling empty pallets, in a palletized live storage system.

12 Claims, 3 Drawing Sheets

PALLET HANDLING METHOD AND APPARATUS

FIELD OF THE INVENTION

The present invention relates to a method of and to an apparatus for pallet handling, and is particularly concerned with the handling of pallets in a live storage warehousing and order-picking system.

BACKGROUND OF THE INVENTION

In an order-picking system, bulk or multiple packages of products, such as loaded pallets, are broken down into individual customer orders which may comprise either a single product, a plurality of different products retrieved from different bulk packages or pallets of products.

Order picking is generally carried out by an operator moving along an order-picking aisle, one side of which is bounded by a conveyor belt moving in the longitudinal direction of the aisle, and the other side of which is bounded by a "picking face". The picking face is constituted by the ends of a number of live storage lanes arranged perpendicularly to the picking aisle, each of the live storage lanes comprising feed means to receive one or more pallets loaded with goods. Loaded pallets are provided to the live storage lanes at their entry ends remote from the picking face, and the feed means moves the pallets towards the picking face to present them at the picking fac in a "first-in-first-out" serial order. The live storage lanes may be provided with sensors at their entry ends which detect the presence or absence of a loaded pallet at the entry end position. In response to the sensor output, an automated loading means retrieves a loaded pallet containing the correct goods for that supply lane, and placed the loaded pallet on the feed means of the supply lane so as to maintain the supply lane filled with loaded pallets.

During order picking, the operator positioned in the picking aisle removes one or more products from the loaded pallet presented at the picking face, and places them either directly on the conveyor for transport to a dispatch station, or into a container for grouping together the products of a particular customer's order. When all the products in the customer's order are retrieved from their respective pallets, the container is transported by the conveyor belt to the dispatch station where the order is packed and shipped. The dispatch station may be automated, or may comprise further operatives who place the order into shipping containers.

When the last product is removed from the pallet at the picking face in a supply lane, the empty pallet must be removed and disposed of, so that the feed means may present the next loaded pallet to the picking face and order picking may continue. The removal and disposal of the empty pallet often causes a difficulty for the order-picking operative, since the standard pallet is a bulky structure weighing some 30 kg.

Conventional product supply lanes comprise rollers arranged in an inclined plane falling towards the picking face, the axes of the rollers being substantially perpendicular to the direction of inclination of the plane. Pallets placed on the rows of rollers move down the inclined plane towards the picking face. A releasable arrester is provided in the supply lane, spaced from the picking face by a distance slightly greater than the corresponding dimension of a pallet. A stop means is provided at the end of the supply lane, to position a pallet at the picking face. When loaded pallets are placed on the rollers at the entry end of the supply lane, the first loaded pallet will move down the rollers to contact the arrester. Subsequent loaded pallets placed in the supply lane move down to abut the pallet which is stopped by the arrester. To present a pallet to the picking face, the operative releases the arrester to allow one pallet to pass, the arrester then engaging the second pallet to prevent its passing. The first pallet moves down to the picking face and contacts the stop means, ensuring that it is correctly positioned for order picking. The arrester is so positioned that there is a clearance between the pallet at the picking face and the next pallet in the supply lane.

When the pallet at the picking face is empty, the operative lifts the edge of the pallet nearest to him to bring the pallet into a vertical position with the upper face of the pallet directed away from the operative. The pallet is then moved along the order picking aisle to a return lane, where the operative must then place the pallet horizontally (and preferably manhandle it so as to place it with its upper face uppermost) so that it can be engaged and removed by a load handling apparatus such as a fork truck or crane. Conventionally, the same load handling apparatus which brings loaded pallets to the supply lanes is used to remove empty pallets from the return lane. When several pallets are present in the return lane, the operative may have to lift the pallet through a considerable distance so that it can be placed on top of the stack of pallets in the return lane. The operative might also have to manhandle each pallet so that its upper surface is uppermost to enable the load handling apparatus to lift the stack of pallets.

In a typical installation, a return lane is provided to serve a number of supply lanes, typically from one to ten or more. In a typical installation a return lane is provided for each ten or so supply lanes and thus the maximum distance which the operative must transport the pallet is equal to the width of approximately 5 supply lanes. Since the typical dimensions of a pallet are one meter wide by 1.2 meters long, and the width of each supply lane is approximately one meter, this manual handling of the empty pallets is tiring for the operative and represents a risk of injury to the operative, particularly if the operative has to carry each pallet a distance of up to five meters, and then form a stack of five or more pallets in the return lane.

OBJECTS OF THE INVENTION

It is an object of the present invention to provide a pallet handling apparatus for a return lane in a live storage system wherein a plurality of pallets may be arranged by an operative without having to lift any of the pallets, and the pallets may then be correctly presented for removal by a load handling apparatus.

It is also an object of the present invention further to provide a pallet handling apparatus which does not require any external power source, but orients the pallets correctly under gravity alone.

SUMMARY OF THE INVENTION

The present invention provides a live storage system comprising a number of supply lanes and a return lane, the return lane comprising a pallet orienting apparatus for presenting empty pallets for removal by a load handling apparatus.

In the method of the present invention at least one empty pallet is moved to a substantially vertical position, placed in a pallet orienting device in a first, substantially vertical, orientation and rotated by the pallet orienting device to a second, substantially horizontal position. Preferably, the method provides for a number of pallets to be arranged in a row with each pallet in a substantially vertical plane, and for the row of pallets to be rotated to form a stack or pile of pallets with each pallet in a substantially horizontal plane.

In a development of the system and method, empty pallets may be raised to a substantially vertical position by powered or power-assisted lifting devices.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
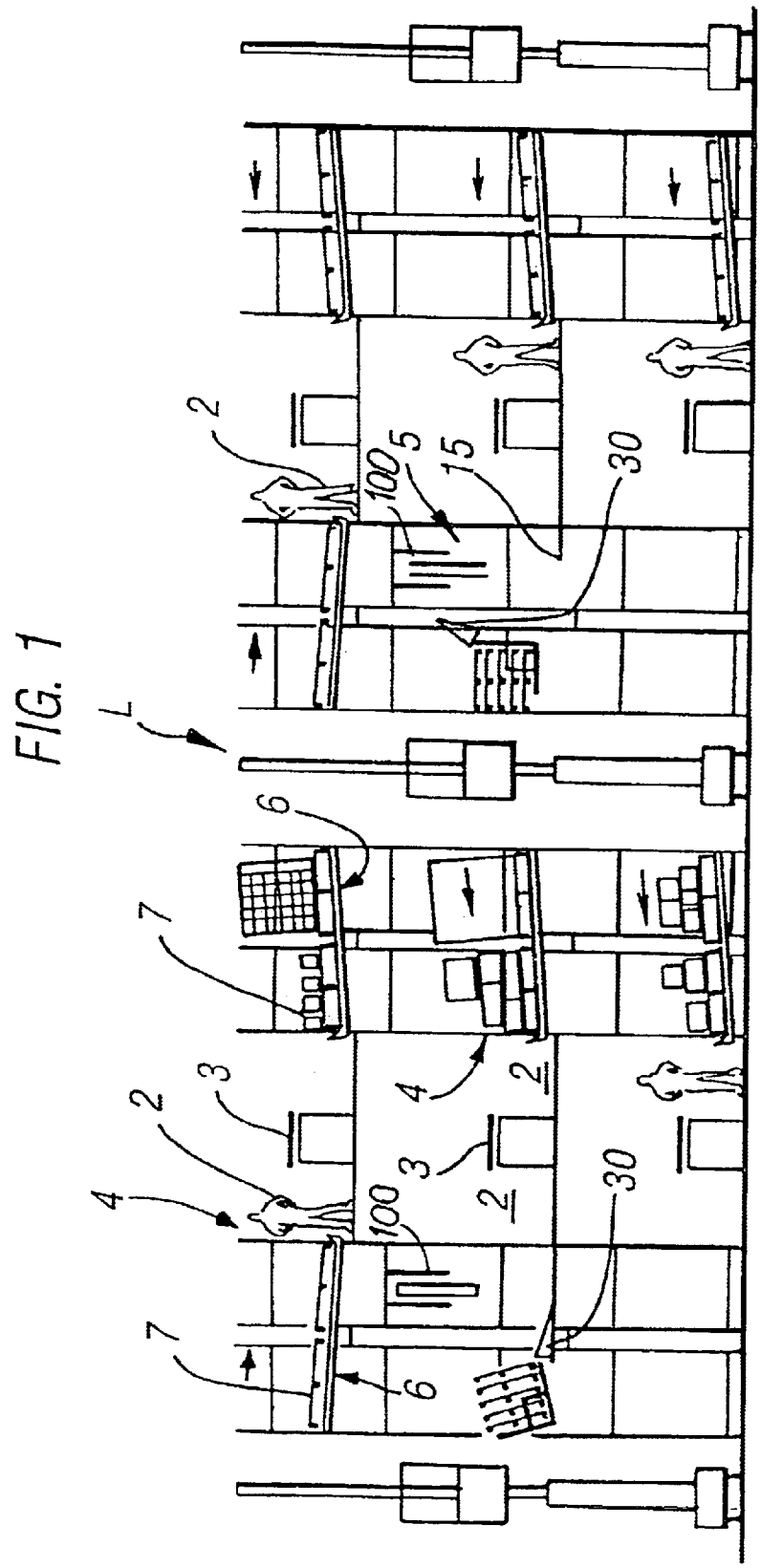
FIG. 1 is a schematic view of a pallet live storage order picking installation, looking in the direction of the order picking aisle.

Referring now to FIG. 1, there is shown a live storage installation for order picking from laden pallets. The installation comprises a plurality of picking aisles 2, each of which is bounded on one side by a conveyor belt 3 extending in the longitudinal direction of the aisle (perpendicular to the plane of the drawing), and on the other side by a picking face 4. It is to be understood that although FIG. 1 shows an installation comprising picking aisles 2 on three levels, and that each conveyor belt 3 is shared by two of the picking aisles 2, it is equally possible to provide a single picking aisle and a single row of supply lanes, or a multi-level installation of four or more levels. Each picking aisle 2 is provided with a number of return lanes 5, for removing empty pallets from the working area. The return lanes 5 are each provided with a pallet orienting apparatus, which will be described in detail later.

The picking face 4 of each picking aisle 2 is supplied by a plurality of supply lanes, each of which includes a feed means 6 capable of accommodating two loaded pallets 7. A supply lane is shown in greater detail in FIG. 2, in schematic side view.

The supply lane comprises an array of rollers 8 in an inclined plane, which constitute the feed means 6. The rollers 8 are supported on inclined beams 9, the beams 9 being so spaced as to be able to support loaded pallets 7. The lower ends of the beams 9 are situated at the picking face 4. The inclination of the beams 9 causes the pallets 7 to move along the feed means 6 towards the picking face 4.

Figure 2:
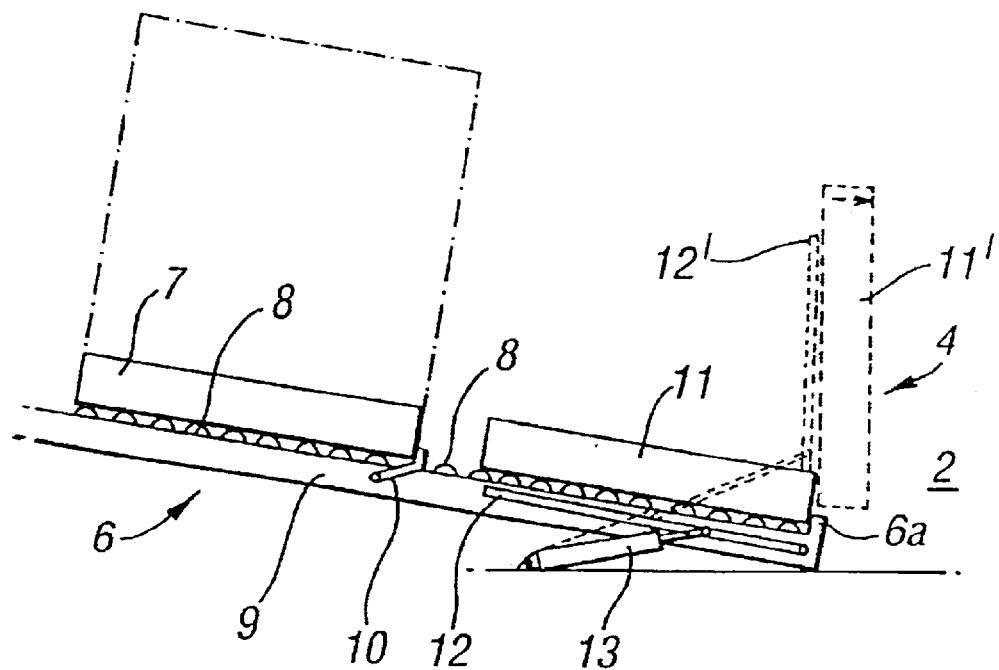
FIG. 2 is a schematic side view of a supply lane with a pallet raising apparatus.

An arrester means 10 is provided in the feed means 6, preferably mounted on one or both of the beams 9. The arrester means 10 has a raised, operative, position as shown in FIG. 2, and a lowered or inoperative position in which the arrester means lies below the rollers 8. In its operative position, the arrester means engages a loaded pallet moving on the rollers 8, and stops its motion along the feed means before it reaches the picking face 4. In its inoperative position, the arrester means 10 permits loaded pallets to pass along the feed means 6 towards the picking face 4. An operating element such as a switch and an actuator, or a mechanical linkage and an operating handle or pedal, is provided for the operative in the picking aisle to operate the arrester means 10 selectively to prevent or permit pallets from passing along the feed means 6 towards the picking face 4. The arrester means is positioned along the beams 9 so as to provide a clearance between a pallet 11 positioned at the picking face 4, and the next pallet 7 in the supply lane.

The supply lane shown in FIG. 2 also comprises a pallet erector for lifting an empty pallet at the picking face into an upright, preferably substantially vertical orientation. The pallet erector comprises an erecting arm 12, and an actuator 13. In the embodiment shown, the actuator 13 is a hydraulic or pneumatic ram. The pallet erector may be power-operated, or may be manually operated through a linkage providing a mechanical advantage to the user. The erecting arm 12 is positioned between the beams 9, and is movable from its retracted position, shown in solid lines in FIG. 2, to an erected position shown in broken lines in FIG. 2. Movement of the erecting arm 12 from the retracted position to the erected position (12') causes the empty pallet 11 at the picking face 4 to be lifted to an upright orientation (11'). The control arrangements for the actuator 13 and the arrester means 10 are preferably interlinked to prevent the arrester means 10 from being released to allow pallet 7 to move towards the picking face 4 unless the erector arm 12 of the pallet erector is in its retracted position.

Figure 3:
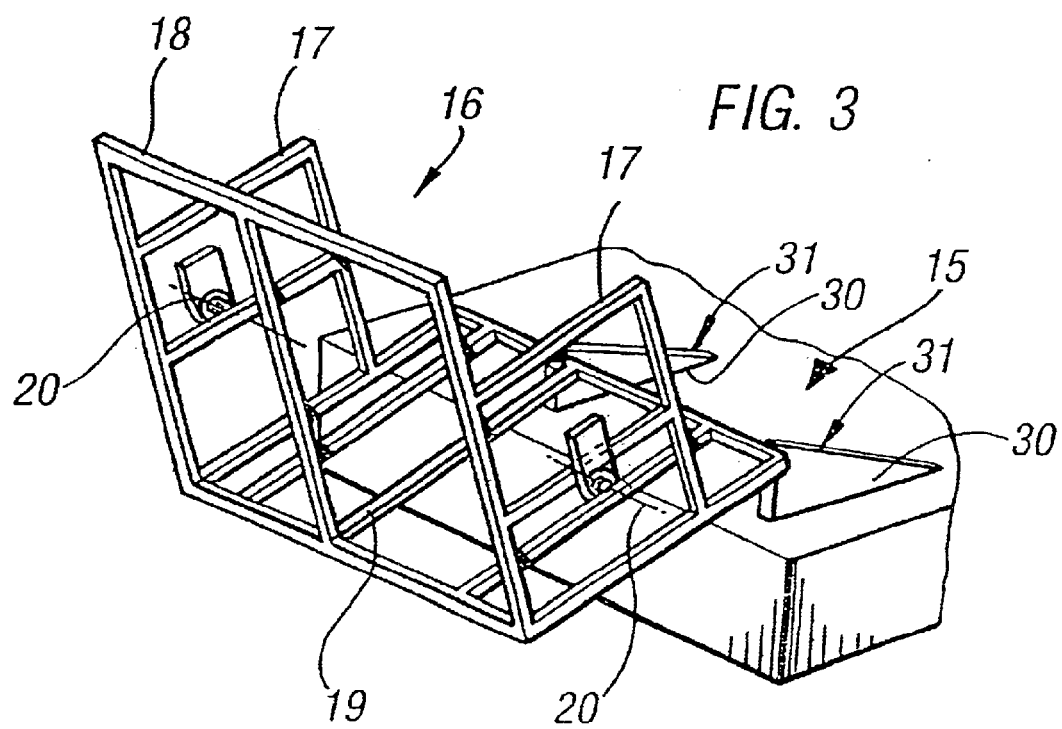
FIG. 3 is a perspective view of a pallet orienting apparatus of the present invention, in its pallet-receiving position.

FIG. 3 shows a pallet orienting means of a return lane 5 of the live storage system shown in FIG. 1. A return lane is shown at the middle level of the leftmost picking aisle 2, and at the middle level of the third picking aisle from the left in FIG. 1.

As can be seen in FIG. 1, the return lane comprises a floor area 15 extended from the picking aisle 2, ramps 30 on the floor area 15, and a pallet orienting device. In FIG. 3 the pallet orienting device is shown in greater detail. The device comprises a cradle 16 having a pair of side frames 17, a back frame 18, and a base frame 19 arranged in orthogonal planes. The cradle is mounted in the return lane 5 for pivoting movement about a horizontal axis 20 between a pallet-receiving position, shown in FIG. 3 and at the middle level of the leftmost picking aisle 2 in FIG. 1, and a pallet delivery position in which the back frame 18 is situated in a substantially horizontal plane. The pallet delivery position is schematically shown at the middle level of the third picking from the left in FIG. 1.

Figure 4:
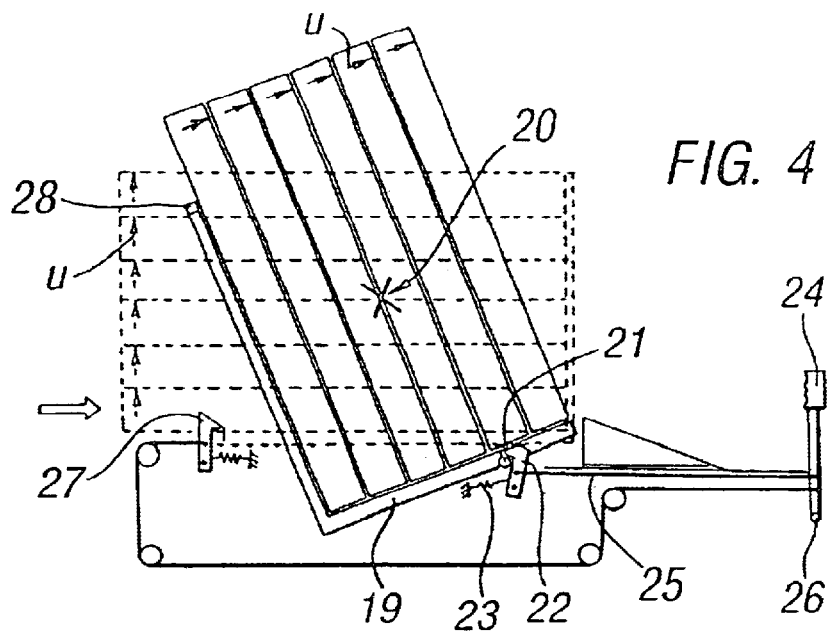
FIG. 4 is a schematic side view illustrating a latching arrangement for the pallet orienting apparatus.

The cradle 16 is shown schematically in FIG. 4, to illustrate a latching arrangement for the cradle. In the arrangement shown in FIG. 4, the cradle is shown in solid lines in its pallet-receiving position, and is shown in broken lines in its pallet delivery position. The cradle is held in the pallet receiving position by a detent 21 provided on the base from 19 of the cradle 16 engaging a releasable latch means 22 mounted to the supporting structure of the return lane. A spring 23 urges the latch 22 to rotate anticlockwise as seen in the FIG., to engage securely with the detent 21. The latch 22 may have a cam surface engageable by the detent 21 to rotate to latch 22 clockwise as the cradle 16 moves towards its pallet-receiving position.

An operating handle 24 is connected to the latch means 22 via an operating cable 25. The operating handle 24 is pivotally mounted at 26 to the supporting structure, so that clockwise rotation of the operating handle 24 will disengage the latch 22 from the detent 21.

In the pallet receiving position, the back frame 18 of the cradle 16 is angled away from the vertical by approximately 15° so that pallets are unable to fall forward (towards the picking aisle 2) out of the cradle. This angle may be chosen to suit particular applications, and is preferably greater than 5°.

A second latching element 27 is provided on the supporting structure, so positioned as to be able to engage a detent 28 on the back frame 18 of the cradle 16 of when the cradle 16 is in the pallet delivery position (shown in broken lines in FIG. 4). The detent 27 is connected by a control cable 29 to the operating handle 24, so that clockwise rotation of the operating handle 24 releases the match 27 from the detent 28. In the illustrated embodiment, tension cables operated by a handle control the latching means. It is to be understood that the latching means may be released either by a mechanical linkage such as levers, chains or cables operated by hand levers, foot pedals or the like or by electromechnical latching means controlled by electrical signals from a control unit. The control unit may comprise pushbutton switches operable by the order picking operative, or may be a computerized stock control system.

In the preferred embodiment shown in FIGS. 3 and 4, the position of the pivot axis 20 is so selected that, when the cradle 16 is empty the cradle tends to rotate under its self-weight towards the pallet-receiving position, and when the cradle is loaded with pallets, the position of the combined center of gravity of the cradle and pallets causes the cradle to rotate towards the pallet delivery position.

Referring to FIG. 4, the weight of the cradle is so distributed that the center of gravity of the cradle 16 lies to the right (as seen in the figure) of the pivot axis 20 irrespective of the angular position of the cradle within its arc of travel between the pallet-receiving and pallet-delivery positions. This ensures that the cradle, when empty, is urged by its own weight to rotate clockwise towards the pallet-receiving position. When the cradle 16 contains a full load of pallets, the center of gravity of the cradle and pallets is arranged to lie to the left of the pivot axis 20 irrespective of the angular position of the cradle within its arc of travel. This ensures that the cradle, when full, is urged by its own weight and the weight of the pallets to rotate counterclockwise towards the pallet delivery position. With this arrangement, when the cradle is in the pallet receiving position and is full of pallets, releasing the latching means 22 will cause the cradle and pallets to rotate anticlockwise to the pallet delivery position, whereupon the latch 27 will engage the detent 28 to retain the cradle in this position. When the pallets are then removed from the cradle, a further actuation of the operating handle 24 of the latching means releases the latch 27, whereupon the cradle 16 rotate clockwise to return to the pallet receiving position and engage the latch 22 with detent 21.

Friction dampers or buffers may be provided on the cradle 16 and/or on the supporting framework so as to cushion any impact between the cradle and stops provided on the supporting structure as the cradle reaches its pallet receiving or pallet delivery positions. Counterbalancing weights or springs may be provided to ensure that the cradle rotates correctly to its respective loading and unloading positions when empty and filled.

The position of the pivot axis 20 of the cradle 16 is so chosen that, when the cradle 16 is in its pallet delivery position, the back frame 18 is substantially level with the entry ends of adjacent supply lanes, so that a load handling apparatus (indicated by L in FIG. 1) can be arranged to deliver loaded pallets to the supply lanes and remove pallets from the cradle 16 at the same loading height. The cradle may be mounted in plain bearings such as phosphor bronze bushes, or ball or roller bearings to reduce bearing friction and minimize the force necessary to rotate the cradle.

In order for the back frame 18 of the cradle 16 to be positioned at the same height as the entry ends of the supply lines, the pallet receiving position may be such that the edge of the base frame 17 nearest to the picking aisle is able the level of the picking aisle floor. To facilitate loading of the pallets into the cradle, ramps 30 may be provided in the return lane. The ramps 30 may have low-friction wear-resistant upper surfaces 31 for engagement with the pallets. Alternatively, the upper surfaces 31 of the ramps 30 may be provided with rollers or a moving belt to reduce with a motorized conveyor arrangement which moves a pallet up the ramp without the operative having to exert any force. Such a motorized conveyor may include detector means to detect the placing of a pallet on the ramp, and control means for controlling the motorized conveyor to transport the pallet up the ramp and then to deactivate the motorized conveyor.

In a further alternative embodiment, the cradle may be rotated between its pallet receiving and pallet delivery positions manually, or by an actuator or by a motor drive, controllable by the operator or under automatic control. The motor drive may comprise electric motors, hydraulic or pneumatic actuators, or a combination of two or more such devices. In this alternative embodiment, the cradle the cradle may be provided with a position sensor to determine whether it is in the pallet receiving or in the pallet delivery position. The cradle may also be provided with detector means to detect the number of pallets present in the cradle, for example by the use of microswitches operated by the pallets when present, or by a load cell or other means for determining the weight of the cradle and its contents. The detector means may be linked, via a control system, to the actuator or motor means controlling the cradle position, so that when the cradle is empty the motor means returns the cradle to its pallet-receiving position, and when the cradle contains a full complement of empty pallets the motor means rotates the cradle to the pallet delivery position.

The drive means can be operated to place the pallet-receiving means in the pallet-delivery position by moving a guard 100 (FIG. 1) into a position to selectively prevent access to the apparatus (center of FIG. 1) or to permit such access (left side in FIG. 1).

Figure 5:
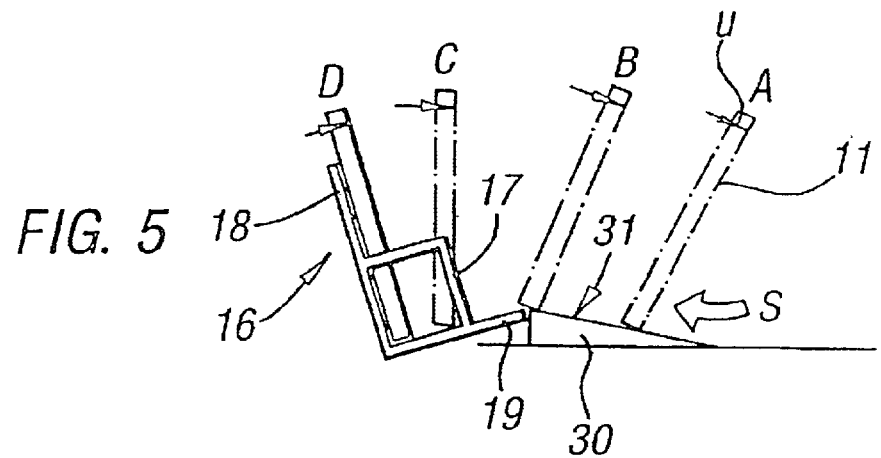
FIG. 5 is a schematic side view showing steps in the placing of a pallet in the pallet orienting apparatus.

FIG. 5 illustrates stages in the placing of an empty pallet into the cradle 16. The pallet is moved along the picking aisle 2 by the operative until it is adjacent a return lane. The operative then advances the lower edge of the pallet 11 onto the ramps 30 (position A), and moves the pallet up the ramps 30 to bring the lower edge of the pallet level with the front edge of the base from 19 of the cradle 16 (position B). This movement may be carried out by the operator pushing the lower edge of the pallet 11 with his shoe, as indicated by the arrow S. The orientation of the pallet is shown by the arrow U indicating the upper surface of the pallet. The operator then pushes the lower edge of the pallet 11 until the pallet rests on the back frame 19 of the cradle 16 (position C), and finally moves the pallet so that its undersurface contacts the back frame 18 of the cradle 16 (position D). In positions C and D, the side frames 17 of the cradle engage the sides of the pallet to locate the pallets in their correct alignment. The side frames 17 may be extended forward (i.e. away from the back frame 18) as far as the front edge of the base frame 19.

The operation of the live storage system using the return arrangements of the present invention will now be described with reference to the drawings. In the live storage arrangement shown in FIG. 1, an operative in the picking aisle 2 will remove items from loaded pallets 7 supported on the feed means 6 of the supply lanes, as these are required for fulfilling orders.

When the pallet 11 at the picking face 4 is empty, the operative will erect the pallet to a substantially vertical position 11', with the upper face of the pallet (on which the load is supported) facing away from the picking face 4. This can be done either using the pallet erecting apparatus 12, 13 shown in FIG. 2, or manually by the operative.

In an advantageous manual method for erecting the empty pallet, the operative grasps the edge of the pallet nearest the picking face, and lifts it over the end stop 6a of the feed means 6 so that the pallet slightly overhangs the end stop. The operative then places a foot on the overhanging edge of the pallet and presses down, to rotate the pallet over the end stop 6a to a vertical position.

After allowing the pallet erector mechanism (if used) to return to its retracted position, the operative then activates the arrester means 10 to allow the next full pallet to move to the picking face of the supply lane.

The empty pallet is moved along the picking aisle to the nearest return lane manually by the operative, either by sliding it along a wear-resistant area of the picking aisle surface or by moving it along conveyor means such as a plurality of recessed rollers provided in the floor of the picking aisle. The wear-resistant area may simply be a metal plate fixed to the floor. The direction along the picking aisle to the nearest return lane may be indicated, for example by markings on the floor of the picking aisle or on the supporting structure for the supply lanes.

When the operative reaches the return lane, he places the lower edge of the pallet onto the ramps 30, and continued pushing of the pallet lifts the pallet up the ramps and places it into the cradle 16, as illustrated in FIG. 5.

When a sufficient number of pallets have been placed in the cradle 16 to fill it, the operative operates the operating handle 24 of the latching mechanism, to release the latch 22 from the detent 21 (FIG. 4). The cradle 16 and pallets then rotate to the pallet delivery position, and latch 27 engages detent 28 on the cradle to retain it in this position. The height of the cradle in this position is so arranged that the lowermost pallet is presented at the same level as the entry ends of the supply lanes, and can be engaged by the load handling apparatus to remove the stack of pallets from the cradle 16.

When the load handling means L has removed the pallets from the cradle, the operator again operates the handle 24 of the latching means and the self-weight of the cradle 16 returns of the cradle to the pallet receiving position, engaging the latch 22. The cradle is then ready to receive the next empty pallet.

In a semi-automated arrangement, the cradle may include sensor means to detect when the cradle is filled with pallets, and a control means to release the latching means when the cradle is filled so that the cradle will move to the pallet delivery position. Preferably, a time delay is included in the control circuitry so that the operative has time to get clear of the cradle after placing the last pallet before the cradle starts to move. When the load handling apparatus L has removed the pallets from the cradle, the sensor means will detect this absence and again operate the latching means, after a suitable delay to allow the load handling apparatus to move clear of the cradle. The cradle will then return to its pallet-receiving position. The control system for the latching means may include further safety features such as means to detect the presence of the operative in the return lane and prevent release of the latching means if the operative is in a position of danger. The sensors and control means of the cradle may be integrated into an overall warehouse management control system, for example to provide control outputs indicating the presence of a full cradle in the pallet delivery position so that the warehouse management control system can direct the load handling apparatus to retrieve the empty pallets.

In the above description, the cradle is referred to as being pivotally mounted on its supporting structure for rotation about a pivot axis 20. In an alternative arrangement, shown schematically in side view in FIG. 6, an alternative structure for the mounting of the cradle 16 and for the ramps 30 is illustrated.

Figure 6:
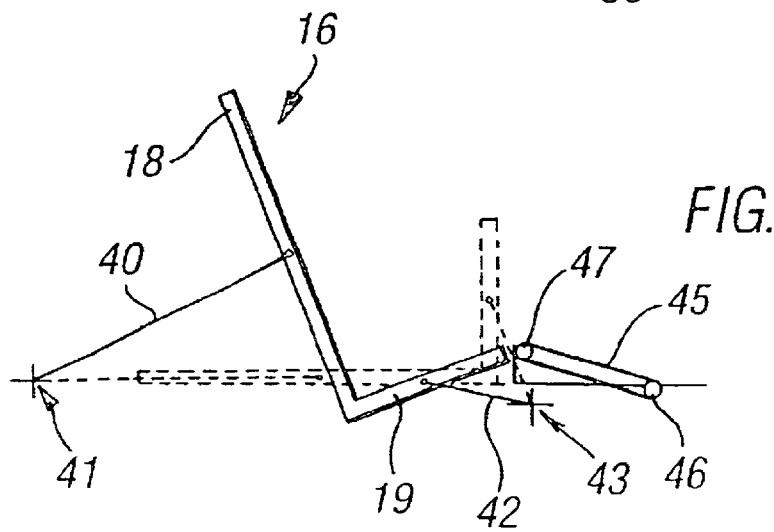
FIG. 6 is a schematic side view showing an alternative mounting arrangement for the pallet orienting apparatus.

The cradle 16 in FIG. 6 comprises a back frame 18 and a base frame 19 as before. A rear pivot arm 40 is pivotally attached to the back frame 18, and is mounted to the supporting structure for rotation about a horizonal axis 41. A front pivot arm 42 is pivotally attached to the base frame 19, and is mounted to the supporting structure for rotation about a horizontal axis 43. The supporting structure may also provide stop means (not shown) to limit the movement of the cradle 16 between a pallet receiving position (shown in solid lines in FIG. 6) and a pallet delivery position (shown in broken lines in FIG. 6). Latching means similar to those shown in FIG. 4 may also be provided to releasably retain the cradle in its pallet receiving an pallet delivery positions, respectively.

The operation of the cradle 16 shown in FIG. 6 is similar to that described in relation to the previous FIGS., the difference being that the pivot arms 40 and 42, the cradle 16 and the supporting structure constitute a four-bar linkage or mechanism which permits the cradle 16 to move relative to the supporting structure between its pallet receiving and pallet delivery positions. The movement of the cradle 16 may be arranged, by selection of the lengths of the pivot arms and the positioning of the axes 41 and 42, to comprise a combination of both rotation and translational movement, instead of the pure rotational movement provided by the pivot of the previous embodiments. Alternatively, the pivot arms 40 and 42 and the pivot axes 41 and 43 may be so selected as to provide pure rotation about a "virtual pivot axis". Actuators may be mounted between the pivot arms 40 and 42 or the cradle 16 and the supporting structure to move the cradle.

Shown schematically in FIG. 6 is a ramp arrangement in which the inclined surface of the ramp is formed by the upper run of a belt 45 extending between two pulleys 46 and 47. Such an arrangement may be used in place of the fixed ramp 30 with its wear-resistant surface 31 shown in previous Figures.

As an alternative to mounting the ramps 30 on the floor of the return lane, it is to be understood that ramps 30 may be mounted to the cradle and may pivot or move therewith.

It is to be further understood that the cradle may be formed not as an open framework structure, but from one or more panels. The panels may be solid panels, or may be perforated to reduce the weight of the structure, alternatively the cradle may comprise a load-bearing framework with a covering of mesh panels to prevent injury to operators.

The embodiments described above are capable of accommodating a single row of pallets in the vertical orientation, to provide a single stack of pallets in the horizontal orientation for collection. It is to be understood that the cradle may be so proportioned as to be able to accept two or more rows of vertically-oriented pallets side by side, and thus present two or more stacks of horizontally-oriented pallets for collection when rotated.

While the system has been described above for use with pallets, it is to be understood that the system is usable with other types of load supports such as totes, slave boards, or the like.

In an advantageous embodiment, the cradle is configured so as to the installable as a modular unit in a lane of a warehouse management storage system without significant modification to the supporting structure.

We claim:

1. A pallet orienting apparatus for orienting planar pallets in a return lane of a live storage system, comprising:

pallet receiving means for receiving a plurality of pallets;

means for mounting said pallet receiving means for movement thereof between a pallet-receiving position in which a number of pallets oriented in substantially upright planes may be placed in the pallet receiving means to form a row of pallets, and a pallet-delivery position wherein the pallets are presented as a stack of pallets with each pallet in a generally horizontal plane; and a drive for moving the pallet-receiving means between the pallet-receiving position and the pallet-delivery position said drive being constructed and operated to place the pallet-receiving means in its pallet-delivery position by moving a guard into a position to prevent access to the apparatus.

2. A pallet orienting apparatus for orienting planar pallets in a return lane of a live storage system, comprising:

pallet receiving means for receiving a plurality of pallets;

means for mounting said pallet receiving means for movement thereof between a pallet-receiving position in which a number of pallets oriented in substantially upright planes may be placed in the pallet receiving means to form a row of pallets, and a pallet-delivery position wherein the pallets are presented as a stack of pallets with each pallet in a generally horizontal plane; and the pallet-receiving means being releasably retainable in the pallet-receiving position by a first latching arrangement and a second latching arrangement.

3. The pallet orienting apparatus defined in claim 2 wherein the second latching arrangement comprises a latching element provided on the supporting structure and a detent on the pallet-receiving means.

4. The pallet orienting apparatus defined in claim 3 wherein said pallet-receiving means is releasably retainable in the pallet-receiving position by a first latching arrangement and wherein the first and second latching arrangements each comprise a respective latching element provided on the supporting structure and a common detent provided on the pallet-receiving means.

5. The pallet orienting apparatus defined in claim 3 wherein the pallet-receiving means comprises a base frame for engaging an edge of a pallet in the pallet-receiving position, and a back frame arranged perpendicular to the base frame for engaging an undersurface of a pallet in the pallet delivery position.

6. The pallet orienting apparatus defined in claim 5 wherein the base frame and back frame are formed as an open framework structure.

7. The pallet orienting apparatus defined in claim 5 wherein the base frame and back frame are formed as panels.

8. The pallet orienting apparatus defined in claim 5 wherein the base frame and back frame are formed as solid panels.

9. The pallet orienting apparatus defined in claim 5 wherein the base frame and back frame are formed as a load-bearing framework with a covering of mesh panels.

10. A pallet orienting apparatus for orienting planar pallets in a return lane of a live storage system, comprising:

pallet receiving means for receiving a plurality of pallets;

means for mounting said pallet receiving means for movement thereof between a pallet-receiving position in which a number of pallets oriented in substantially upright planes may be placed in the pallet receiving means to form a row of pallets, and a pallet-delivery position wherein the pallet are presented as a stack of pallets with each pallet in a generally horizontal plane; and the pallet-receiving means being mounted to a supporting structure for pivoting movement, and the movement between the pallet-receiving position and the pallet-delivery position comprises rotation about a horizontal axis the position of the axis being so selected that, when the pallet-receiving means is empty the pallet receiving means tends to rotate under its self-weight towards the pallet-receiving position and when the pallet-receiving means is loaded with pallets, the position of the combined center of gravity of the pallet receiving means and pallets causes the pallet-receiving means to rotate towards the pallet-delivery position.

11. The pallet orienting apparatus defined in claim 10 wherein counterbalancing weights or springs are provided to ensure that the pallet-receiving means rotates to its respective loading and unloading positions when empty and filled.

12. A pallet live storage system comprising a supply lane for loaded pallets and a return lane for empty pallets, wherein the return lane is provided with pallet orienting apparatus comprising pallet-receiving means movable between a pallet-receiving position in which a number of pallets oriented in substantially upright planes may be placed in the receiving means to form a row of pallets, and a pallet-delivery position wherein the pallets are presented as a stack of pallets with each pallet in a generally horizontal plane; and ramps are provided in the return lane, the ramps being mounted to the pallet-receiving means and moving therewith.

* * * * *